United States Patent [19]

Coetzer et al.

[11] 4,366,215

[45] Dec. 28, 1982

[54] ELECTROCHEMICAL CELL

[75] Inventors: Johan Coetzer; Michael M. Thackeray, both of Pretoria, South Africa

[73] Assignee: South African Inventions Development Corp., Pretoria, South Africa

[21] Appl. No.: 202,323

[22] Filed: Oct. 30, 1980

[30] Foreign Application Priority Data

Nov. 6, 1979 [ZA] South Africa ............. 79/5963
Jan. 14, 1980 [ZA] South Africa ............. 80/0214
Jul. 18, 1980 [ZA] South Africa ............. 80/4346

[51] Int. Cl.³ ................. H01M 4/04; H01M 4/62
[52] U.S. Cl. ................. 429/199; 429/218; 429/232; 429/224; 204/2.1
[58] Field of Search ............. 429/221, 218, 194, 197, 429/112, 222, 223, 224, 232; 204/2.1

[56] References Cited

U.S. PATENT DOCUMENTS 3,939,008  2/1976  Longo et al. ............. 429/223
4,132,619  1/1979  Klein et al. ............. 429/221
4,136,233  1/1979  Eisenberg ............. 429/112

FOREIGN PATENT DOCUMENTS 53-104085   8/1978  Japan .
53-120629   9/1978  Japan .
53-125326  10/1978  Japan .
1224273     3/1971  United Kingdom .
1346794     2/1974  United Kingdom .
1461764     1/1977  United Kingdom .
1537111    12/1978  United Kingdom .

OTHER PUBLICATIONS

Proc. 28th Power Sources Symposium, 1978, Eisenberg.
J. Electrochem. Soc. 110, No. 6 (1963) 469, Selis et al.
Quart. Rev. Chem. Soc. 22, 30 (1968)–Dickens & Whittingham.
Liebert, B. E., PhD Thesis, Stanford Univ. 1977.
Murphy et al., Metal Chalcogenides as Reversible Electrodes in Nonaqueous Lithium Batteries, Journal of Crystal Growth 39 (1977) 185–199.

*Primary Examiner*—Donald L. Walton
*Attorney, Agent, or Firm*—Arnold, White & Durkee

[57] ABSTRACT

A method of making a cathode for a secondary electrochemical cell is disclosed. The method involves activating or preconditioning an oxide which has a spinel-type or oxo-spinel type structure of the formula $AB_2O_4$ with at least one of A or B being a transition metal, and A and B being di-, tri-, or tetravalent cations selected from Ti, V, Cr, Mn, Fe, Co, Ni, Cu, Zn, Mg and Al. The method provides a cathode, which is in the form of a stable three-dimensional framework structure. In a secondary electrochemical cell the structure of the cathode is capable of reversible charge/discharge reactions while being stable with regard to other physical or chemical changes in structure.

19 Claims, No Drawings

ELECTROCHEMICAL CELL

This invention relates, broadly, to an electrochemical cell. More particularly, the invention relates to a method of making a cathode for a secondary electrochemical cell; to a cathode when made according to the method; and to an electrochemical cell including the cathode.

According to the invention a method of making a cathode for a secondary electrochemical cell comprises activating or preconditioning an oxide which has a spinel-type or oxospinel-type structure according to the formula $$AB_2O_4$$

wherein: at least one of A or B is a transition metal; and each of A and B is a di-, tri- or tetravalent cation of a metal selected from the group consisting in Ti, V, Cr, Mn, Fe, Co, Ni, Cu, Zn, Mg and Al to form therefrom a cathode which is in the form of a stable three dimensional framework structure, the structure, when in a secondary electrochemical cell with a compatible electrolyte and a compatible anode, being capable of reversible charge/discharge reactions while being stable with regard to other physical or chemical changes in structure.

"Spinel-type" or "oxospinel-type" structure means a structure which is similar or isomorphous to $MgAl_2O_4$ (spinel). In the structure of spinel the oxygen anions are arranged in a cubic close packed fashion to form a negatively charged framework structure of tetrahedra and octahedra. The A cations are located in tetrahedral sites and the B cations in octahedral sites. The packing arrangement in this case is known as a "normal" spinel structure. It is possible however for the cations to be rearranged whereby half the B cations occupy tetrahedal sites and the A cations share octahedral sites with the remaining B cations to provide what is known as an "inverse" spinel structure. The inverse spinels are therefore best represented as $B(AB)O_4$ to differentiate them from normal spinel $AB_2O_4$ structures. "Spinel-type" or "oxospinel-type" structures in this specification include both normal and inverse spinel-type structures.

In accordance with the method, the oxide $AB_2O_4$ may be the starting material which is activated or preconditioned directly, or it may be an intermediate which is obtained during the activation or preconditioning of other oxides of the metals in question to obtain the three dimensional framework structure of the cathode. In this case the starting materials would be oxides of the metals in question which do not have the $AB_2O_4$ spinel- or oxospinel-type structure but can transform chemically or electrochemically during the activation to an intermediate which has the required $AB_2O_4$ structure as defined above, for example by controlled reduction, oxidation or disproportionation.

Thus, for example, where the spinel-type structure in question is $Fe_3O_4$, having one divalent iron cation and two trivalent iron cations, it may be obtained from alpha-$Fe_2O_3$ (which has a corundum-type structure) by electrochemical reduction or by direct reaction with an alkali metal vapour such as Na; or from gamma-$Fe_2O_3$ (which has a spinel-type structure) by controlled reduction; or from FeO (which has a rock salt structure) by disproportionation. In these cases the alpha-$Fe_2O_3$, gamma-$Fe_2O_3$ or FeO is the starting material which is activated via $Fe_3O_4$ as an intermediate, to obtain the three dimensional framework structure of the cathode. Analogous or isomorphous starting materials, giving the required $AB_2O_4$ intermediate, can be dealt with in the same fashion, e.g. $FeTiO_3$ or $CoTiO_3$ which have an ilmenite structure isomorphous with the corundum structure of alpha-$Fe_2O_3$. Other starting materials which may be suitable to provide $AB_2O_4$ intermediate are those having a bixbyite structure such as $Mn_2O_3$ or a pseudobrookite structure such as $Fe_2TiO_5$ and those having a perovskite structure may be suitable if they are capable of transformation during activation to the required spinel-type structure.

Particularly good results have been obtained when the starting material has been the corundum-type structure of alpha-$Fe_2O_3$ which has been converted, with the removal from the framework structure of oxygen atoms, from the hexagonal close-packed arrangement of the corundum-type structure, to the cubic close-packed arrangement of the spinel-type structure. These oxygen atoms appear to remain in the cathode structure, with an improvement in discharge capacity, although the reason therefor is not understood.

Activation or preconditioning may be electrochemical, by subjecting the oxide to a plurality of charge/discharge cycles in an electrochemical cell wherein the oxide forms the cathode, and is coupled with a compatible electrolyte and a compatible anode. Without being bound by theory, the applicant believes that the activation leads to a cathode which has a three dimensional framework or lattice like skeletal structure, and activation is continued until the structure becomes stable and is inert to further physical or chemical changes, other than those involved in reversible charge/discharge reactions in a cell.

It is not certain whether or not said $AB_2O_4$ spinel-type structure remains intact during activation, and if so, to what degree. The nature of the cathode structure, after activation, need thus have little physical or chemical similarity to the $AB_2O_4$ oxide starting material, but, from its observed characteristics when used as a cathode in a reversible secondary electrochemical cell, it is believed to be made up of oxygen anions and to have an open skeletal nature. Its three dimensional skeletal nature may thus involve internal cavities, channels etc, which are accessible to electrochemically active substances from the anode and/or electrolyte via windows, pores or the like in its surface. The possibility that the spinel-type framework structure remains substantially intact in the activated cathode, should however not be excluded.

The exact nature of the activation depends on the nature of the starting oxide, the electrolyte used, and the anode. The electrolyte and anode should thus be chosen to ensure that the desired stable three dimensional cathode structure is obtained. It is contemplated in this regard that the cathode structure, when activated, can contain chemical species from the starting oxide and/or species from the electrolyte and/or anode. The invention is thus restricted to those combinations of starting oxide, electrolyte and anode, which lead to a stable cathode structure capable of reversible charge/discharge reactions in a secondary electrochemical cell.

In the unit cell of a normal spinel structure there are eight $AB_2O_4$ units. Each unit cell contains sixty-four tetrahedra of which eight are occupied by the A metal cations, and thirty-two octahedra of which sixteen are occupied by the B metal cations. Thus there are many empty polyhedral (fifty-six tetrahedral and sixteen octahedral) sites in the unit cell which can possibly be at least partially filled by electrolyte cations such as lithium cations during discharging in the activation charge/discharge cycles, to form an insertion-type compound, the electrolyte cations then leaving these sites during the charging.

If the discharge reaction on activation is taken to completion and is such that the metal ions of the cathode are reduced to the pure metal, breakdown of any skeletal structure in the cathode can possibly be expected, so that such discharging should be restricted, to say 80% of theoretical capacity, to avoid such breakdown. During such activation, however, and when activation is nearing completion, discharge capacities in excess of 500 mA-hr/g have been observed for an $Fe_3O_4$ and an $Fe_2O_3$ starting material for a cathode (more than 50% of theoretical capacity or cathode utilization) and this indicates that the charge/discharge mechanism may not involve simple or mere insertion of ions into the structure, and the spinel-type structure of the cathode may distort or rearrange during discharging to provide some new but stable skeletal structure in the final discharged activated cathode. It is not known to what extent, the spinel-type structure is regenerated during charging of the activated cathode, or whether the new structure remains intact, but X-ray evidence indicates that the spinel-type structure is at least partially broken down in the discharged activated cathode, so that an 80% discharged cathode formed from $Fe_3O_4$ shows weak X-ray evidence of the presence of $Fe_3O_4$. However a partially discharged $Fe_2O_3$ cathode clearly shows lines of $Fe_3O_4$.

The possibility that the oxo-spinel-type structure may be partially or completely regenerated upon charging should however not be excluded.

Similarly, when alpha-$Fe_2O_3$ having a corundum-type structure is used as the starting material, it is not known to what extent, if at all, this corundum-type structure is regenerated during charging, and the possibility that it may be regenerated via a spinel-type structure should not be excluded.

Thus charging of the activated cathode could involve removal of electrolyte cations, and/or it could involve incorporation of electrolyte anions into the skeletal structure, for example when the electrolyte is an alkali metal halide, to form an alkali metal/transition metal oxyhalide structure.

Suitable electrolytes for the activation are those which contain alkali metal and/or alkaline earth metal ions and halide ions, the electrolytes during activation being in liquid form.

The electrolyte used for the activation may comprise one or more alkali metal halides or one or more alkaline earth metal halides, or it may comprise one or more alkali metal halides mixed with one or more alkaline earth metal halides. The electrolyte may also contain one or more aluminium halides and it may be in molten salt form or dissolved in an organic solvent.

The electrolyte conveniently comprises a lithium halide, such as LiCl alone or in admixture with other alkali metal/alkaline earth metal halides and/or aluminium halides. The electrolyte is conveniently a high temperature electrolyte, having a melting point of above 150° C., e.g. up to 400° C. or more, or it may be a room temperature electrolyte such as $LiClO_4$ in propylene carbonate.

The anode used for activation similarly may comprise one or more alkali metals or alkaline earth metals, alone or in admixture or alloys together and/or with other metals such as aluminium. The material of the anode will be chosen so that it is electrochemically compatible with the oxide starting material and electrolyte for the purpose of activation, and so that it can be handled conveniently at the temperature of activation.

Preferably, the $AB_2O_4$ oxide used to form the three dimensional framework structure is an oxide of a transition metal of the first series. Thus, in an embodiment of the invention, the oxide may be an oxide of iron, cobalt or manganese, for example $Fe_3O_4$, $Co_3O_4$ or $Mn_3O_4$. When the $AB_2O_4$ oxide is $Fe_3O_4$ it can be obtained as an intermediate by starting with alpha- or gamma-$Fe_2O_3$ or with FeO as mentioned above, or by analogy, the starting material may be $Mn_2O_3$ having a bixbyite structure with $Mn_3O_4$ as the spinel-type intermediate.

The starting oxide may comprise several oxides of a transition metal at least one of which has, or passes through, a spinel-type structure during activation, or it may comprise the oxides of a plurality of transition metals according to the formula $AB_2O_4$ as defined.

Other transition metal oxides, which upon activation pass through a spinel-type intermediate structure to obtain the final activated stable three dimensional skeletal structure include $FeTiO_3$ (corundum-type structure) and $Fe_2TiO_5$ (pseudobrookite-type structure).

In a further embodiment of the invention, the framework structure of the cathode may be formed from an oxide which comprises an oxide or oxides (a solid solution) of a mixture or alloy of two or more transition metals such as $CoFe_2O_4$, or an oxide or oxides of a mixture or alloy of one or more transition metals with one or more other metals, the oxide or oxides of other metal or metals constituting a minor proportion of the mixture or solid solution, of less than, say, 50% by weight, conveniently less than 20% by weight of the mixture or solid solution.

Similarly, the $AB_2O_4$ transition metal oxide which is activated to form the cathode may be in admixture with transition metal carbides, silicides, phosphides, borides and/or nitrides. The oxides may form the major proportion of the mixture, comprising more than 50% by weight, preferably more than 80% by weight thereof.

In yet a further embodiment of the invention, the $AB_2O_4$ spinel-type oxide may be part of a mixture, containing a proportion of chalco-spinels of the formula $AB_2X_4$ where A and B are as defined above, and X is a chalcogen such as sulphur, selenium or tellurium; or it may be modified to be of the formula $AB_2O_nX_{4-n}$ where A, B and X are as defined and n is more than 0 and less than 4.

Certain cathode structures obtained by the activation may be insufficiently electron-conductive for effective use as cathodes. In these embodiments of the invention the method may include incorporating a suitable electron-conductive material, which is effective at the operating temperature of the cell, such as graphite, $MoS_2$, WC, TiC, or the like into the cathode structure. TiC has been shown to work well (as should transition metal carbides, phosphides, silicides, borides and/or nitrides in general) as a current collector, and in fact raises the level of the discharge voltage plateau in a cell having an alpha-$Fe_2O_3$ starting material for the cathode, when compared with a graphite current collector in the same cell. Thus, when the cathode comprises framework structures derived from oxides such as $Fe_2O_3$, $Fe_3O_4$, $Co_3O_4$, $Mn_3O_4$, $FeTiO_3$ etc., these structures may be in particulate or powder form mixed with powdered graphite. It will be appreciated in this regard that the framework structure will be found in the interior of each oxide particle.

In this regard it should be noted that certain spinel-type $AB_2O_4$ oxides such as magnetite ($Fe_3O_4$) are inherently electronically conductive, so that a minimum of additional electron-conductive material may be needed. However, it is not known to what extent such inherent conductivity will remain after full activation. It should also be appreciated that oxides with spinel-type structures which are not inherently electron conductive may become so when inserted ions are incorporated into the structure during discharge.

Instead, it may be possible to form a porous coating of graphite on the cathode particles, for example, by treating the particles with a colloidal graphite suspension followed by drying, or by vapour phase coating.

The graphite layer should be porous and conveniently the proportion thereof should be as low as possible, consistent with effective electron conduction during use, since graphite can act as an electrolyte barrier to limit electrolyte access to the cathode particles.

In practice, the proportion of electron-conductive material should be selected to provide a desired balance between electrolyte access and electron conductivity during use in a cell. A further factor is that the total mass of electron-conductive material should be as low as possible to give the maximum energy to weight ratio.

It is believed that between about 5–16% of graphite may provide sufficient electron conductivity, but when powdered graphite is used, substantially greater proportions may be included so that the invention contemplates the use of between 5 and 60% by weight of graphite powder.

For loosely compacted cathodes it will be appreciated that where the cathode comprises a mixture of graphite powder and particles derived from the oxide, if the graphite particle sizes are too small, the electrolyte movement through the cathode will be retarded during use but electronic conductivity will be improved, and vice versa if the graphite particle sizes are too large. In practice therefore, a suitable balance will have to be drawn in this regard.

The method of forming the cathode of this invention may include forming it into a self-supporting body or matrix by suitably compacting it, with or supporting it by a binding agent, by holding it in a supporting body or matrix, by containing it in or locating it on a porous cathode holder, or the like.

In an embodiment of the invention, the cathode may be contained in a suitable porous, corrosion-resistant cathode holder. This cathode holder may be in the form of a porous graphite cup or vessel.

Compaction of the cathode can improve interparticle contact, thereby providing for enhanced electron conductivity. Compaction of the cathode can, however, reduce the porosity of the cathode and thus influence the diffusion of the electrolyte into the cathode during use.

Compaction may therefore be carried out to balance the requirements of mechanical rigidity and improved electron conductivity against the requirement that electrolyte access to the cathode should be sufficient during use to allow the cathode to function as an essentially three-dimensional cathode and thus provide sufficient current density.

Instead, compaction of the cathode can be carried out to provide cathode discs or pellets which have sufficient rigidity to be substantially self-supporting. These may then be used without a cathode holder, although such holder may nevertheless be preferred so that if the pellets or discs fracture during use, the cathode holder will retain them largely intact.

When the cathode has been properly compacted, it can provide the advantage that the volume to mass ratio of the cathode has been improved, and the further advantage that since electron conductivity can be enhanced, the relative mass of the electron-conductive material may be reduced, thereby permitting the use of the cathode of a relatively reduced mass. In addition, as the cathode will be substantially more self-supporting, it can be handled more easily.

Activation of the oxide can be an initial step in forming the cathode, or it may be the final step, after all the other cathode-forming steps have been carried out.

When the cathode is activated electrochemically by subjecting it to a plurality of charge and discharge cycles as a cathode in an electrochemical cell, the method will include using a compatible anode and using an electrolyte which has an intrinsic electrolysis voltage threshold greater than the threshold voltage for activation of the transition metal starting oxide.

Once the starting oxide has been subjected to sufficient charge/discharge cycles, it will have been activated sufficiently to allow it to be used as a cathode in a cell.

From experiments conducted by Applicants, it was found that the oxide was activated sufficiently once it had been subjected to between 2 and 20 charge/discharge cycles.

The threshold voltage for activation will depend upon the particular metal/s of the oxide. It is believed, however, that the threshold voltage for activation will also depend upon the particular halide ion as well as the alkali metal ion used in the activation process.

Considerations of thermal stability will affect the choice of electrolyte and/or anode used to activate a particular starting oxide.

The invention also extends to a cathode for a secondary electrochemical cell, which cathode comprises a three dimensional framework structure obtained by activating an oxide of at least one transition metal according to the method described above.

The invention extends further to a secondary electrochemical cell comprising a cathode which discharges to a stable three dimensional framework structure obtained from activation of an oxide of a transition metal as described above, a compatible electrolyte and a compatible anode.

The cathode may be such that upon charging, the original oxide structure is at least partially regenerated.

The cell may be the same cell in which the cathode was formed by activation from the starting oxide, i.e. the starting oxide is activated in situ to form the stable three dimensional framework structure of the cathode. Instead, the cathode may be activated in one cell, and may be used in another cell, i.e. the cathode, after activation is used in another cell with a different anode and/or electrolyte, e.g. an electrolyte which has a lower melting point than that of the electrolyte used for activation.

The anode of the cell may be any anode which is compatible with the cathode and with the electrolyte.

The anode, whether it is the anode used for activation or the anode of a different cell in which the cathode is used after activation, may comprise or include an alkali metal, a combination of alkali metals, an alkaline earth metal, a combination of alkaline earth metals, a combination or alloy or alkali and alkaline earth metals, or an alloy or combination containing alkali and/or alkaline earth metals and other metals.

Where the anode is in the form of an alkali metal, the alkali metal may conveniently be lithium or sodium.

Where the anode comprises an alkaline earth metal, the alkaline earth metal may conveniently be magnesium.

Where the anode comprises an alloy or composition containing the alkali and/or alkaline earth metals, said one or more of the alkali and/or alkaline earth metals may be included in the alloy or composition, and the remaining constituent of the alloy or composition may comprise any compatible metal or similar substance which can form a suitable alloy or composition with the alkali and/or alkaline earth metal.

Thus, for example, the remaining constituent may comprise silicon, aluminium, boron or the like.

Since the mass of the anode is often a factor of importance, in such instances the remaining constituent would preferably be a light metal or substance such as aluminium or silicon.

In a further embodiment of the invention, the anode may be pure aluminium.

Because the framework structure of the cathode may, apart from the charge/discharge reaction of the cell, be inert to physical and/or chemical changes after activation, the electrolyte of the cell in which the cathode is finally used can be an electrolyte which will be molten or liquid at the cell operating temperature.

If desired, however, the electrolyte may comprise a combination of a solid electrolyte and a molten or liquid electrolyte between the solid electrolyte and the cathode.

This solid electrolyte may be any suitable or conventional solid electrolyte such as, for example, beta alumina, nasicon (i.e. $Na_3Zr_2PSi_2O_{12}$), analogues thereof, or the like.

The liquid electrolyte may include alkali metal or alkaline earth metal halide salts such as lithium chloride, calcium chloride, calcium fluoride, magnesium chloride, lithium bromide or the like.

In an alternative embodiment of the invention, the electrolyte may comprise binary, ternary, etc., salt mixtures of alkali metal and/or alkaline earth metal halide salts.

Thus, for example, the electrolyte may comprise lithium iodide-potassium iodide, lithium chloride-potassium chloride, lithium chloride-magnesium chloride, lithium fluoride-lithium chloride-lithium bromide, or the like.

In an alternative embodiment of the invention, the electrolyte may comprise an alkali metal ion-containing or an alkaline earth metal ion-containing electrolyte for example lithium perchlorate ($LiClO_4$) dissolved in an aprotic solvent. The aprotic solvent may by any suitable solvent such as, for example, propylene carbonate or the like.

In an alternative embodiment of the invention, the electrolyte, for example, molten alkali metal halide salts, may be doped with an aluminium halide such as $AlCl_3$ or with some other suitable dopant to reduce the melting point of the electrolyte.

Thus, for example, the electrolyte may be in the form of an alkali metal halide-aluminium halide mixture or a double salt or in the form of an alkaline earth metal halide-aluminium halide mixture or a double salt or a mixture thereof.

Thus, for example, the electrolyte may comprise $NaAlCl_4$; $LiAlCl_4$; or the like.

Where the electrolyte is a mixture or a melt it may conveniently be a eutectic mixture or melt.

In an embodiment of the invention, the electrolyte may be associated with dehydrated zeolite crystals, for example, by being impregnated into the dehydrated zeolite crystals. In this embodiment, the zeolite crystals can serve as a convenient carrier for the electrolyte in its molten or solid state during use.

The cell in which the cathode is finally used may include any suitable form of electrode separator. In a specific embodiment of the invention, the electrode separator may comprise a fully dehydrated layer of suitable zeolite crystals on the cathode. In this embodiment, the separator may further function as a scavenger for undesirable reaction products during use, and for other cell poisoning materials.

The cell of this invention in which the cathode is finally used may be sealed in any suitable material such as, for example, corrosion-resistant lightweight material. In an embodiment of the invention, the cell may be sealed in an inert gas atmosphere in a stainless steel shell.

The cathode of this invention has application in secondary cells i.e. rechargeable secondary cells. Similarly, it will be appreciated that cells in accordance with this invention can readily be assembled in battery form as may be required. The invention therefore extends to a battery comprising a plurality of associated cells as described herein.

The cathode may also be used in a primary cell, or battery of such primary cells, if desired.

An embodiment of the invention is now described by way of example with reference to the following experiment.

A cell was prepared having a lithium-aluminium alloy anode having about 20 atomic percent lithium, and a surface area of 6.9 $cm^2$. In this regard the exact proportion of lithium in the alloy was not regarded as significant, provided it was between about 7 and 50 atomic percent. The cell had an unactivated cathode comprising 3 grams of $Fe_3O_4$ mixed with graphite in a 1:1 ratio by mass, contained in a porous graphite cup. The electrolyte of the cell was a lithium chloride-potassium chloride eutectic. The operating conditions were as follows:

Charge/Discharge Current: 40 mA
Operating Temperature: 420° C.
Upper Cut-off Voltage: 1,7 volts
Lower Cut-off Voltage: 0.5 volts.

(By Upper Cut-off Voltage is meant the upper limit to which the cell is charged; and
by Lower Cut-off Voltage is meant the lower limit to which the cell is discharged).

Results which were obtained from the cell are set out in the following table, Table 1.

TABLE 1

| | |
|---|---|
| Open Circuit Voltage: | 1,7 volts |
| Short Circuit Current: | 200 mA/$cm^2$ |
| Discharge Capacity: | 1,92 Amp-hrs. (3rd cycle) |
| Cathode Utilization: | 70% (3rd cycle) |
| Coulombic Efficiency: | 94% (3rd cycle) |

TABLE 1-continued

| Number of Cycles: | 5 |
|---|---|
| Approximate Number of Working Hours: | More than 450 |

Disintegration of the anode after 5 full cycles caused cell failure.

It is to be noted with regard to the example described above the cell was loaded in a charged state, but with the cathode in the form of said graphite/$Fe_3O_4$ mixture. As soon as the cell is loaded, it is ready to be discharged and thereafter cyclically charged and discharged. The charging of the cell was at a voltage less than the electrolysis or breakdown voltage of the electrolyte. During the initial charge/discharge cycles of the cell the $Fe_3O_4$ of the cathode was activated into a stable, inert, three dimensional framework structure of the cathode of the present invention, after which it stabilized and underwent no further changes, except for the usual changes involved in the charge/discharge cycles encountered in steady-state cell use, the cathode operating reversibly in a secondary sense.

A further series of experiments were carried out with cells in accordance with the invention. The cells were operated as high temperature reversible or secondary cells at 420° C. using lithium-aluminium alloys as anodes and using LiCl/KCl electrolytes. The results are set out in the following table, Table II:

TABLE II

| | Experiment No. | | | | | | | | | |
|---|---|---|---|---|---|---|---|---|---|---|
| | 1 (Control) | 2a | 2b | 2c | 3a | 3b | 3c | 4a | 4b | 5 |
| Cathode Starting Material | Fe | $Fe_3O_4$ | $Fe_3O_4$ | $Fe_3O_4$ | alpha-$Fe_2O_3$ | alpha-$Fe_2O_3$ | alpha-$Fe_2O_3$ (TiC current collector) | $Cr_2O_3$ | $Cr_2O_3$ | $Mn_2O_3$ |
| Structure type | | Spinel | Spinel | Spinel | Corundum | Corundum | Corundum | Corundum | Corundum | Bixbyite |
| Open Circuit Voltage (V) | 1,80 | 1,80 | 1,77 | 1,81 | 1,86 | 1,85 | 2,18 | 1,80 | 2,3 | 1,82 |
| Short Circuit current (A) | 2,2 | 1,3 | 1,0 | 2,5 | 1,85 | 2,30 | 1,00 | 0,9 | 2,0 | 1,5 |
| Charge Current (mA) | 30 | 40 | 50 | 50 | 50 | 50 | 50 | 40 | 30 | 56 |
| Discharge Current (mA) | 30 | 40 | 50 | 50 | 50 | 50 | 50 | 40 | 30 | 50 |
| Cut off Limits (V) upper | 2,00 | 1,70 | 2,40 | 2,30 | 2,30 | 2,40 | 2,65 | 2,64 | 2,60 | 1,80 |
| lower | 0,5 | 0,5 | 0,5 | 0,6 | 0,5 | 0,6 | 0,6 | 0,4 | 0,6 | 0,3 |
| Voltage plateaus (discharge) | 1,75 | 1,0 | 1,5 (short) 1,0 | 1,6 (short) 0,9 | 1,6 (short) 0,9–1,0 | 1,6 (short) 0,9 | 1,0–1,6 | 1,2 | 1,5 | 1,0 (short) 0,55 |
| Maximum Discharge Capacity (A-hr/g) | 0,15 (18) | 0,75 (4) | 0,48 (25) | 0,51 (21) | 0,72 (10) | 0,63 (17) | 0,41 (12) | 0,22 (1) | 0,13 (8) | 0,75 (10) |
| Capacity on last recorded cycle (A-hr/gm) | 0,04 (53) | 0,68 (5) | 0,32 (39) | 0,34 (43) | 0,46 (116) | 0,58 (18) | 0,27 (26) | 0,03 (59) | 0,06 (20) | 0,16 (86) |
| Maximum % Cathode Utilization | 10(18) | 81(4) | 52(25) | 55(21) | 72(10) | 63(17) | 41(12) | 20(1) | 12(8) | 74(10) |
| Coulombic Efficiency (%) | 25(18) | 94(3) | 97(26) | 98(21) | 100(10) | 96(17) | 84(12) | 85(2) | 92(8) | 86(10) |
| Total Cycles | 53 | 5 | 39 | 43 | 116 | 18 | 26 | 59 | 20 | 86 |
| Total days | 75 | 21 | 88 | 110 | 335 | 49 | 55 | 36 | 21 | 207 |
| Reason for termination | Deteriorating cell performance | Anode collapse | Mo feed-through corroded | Post mortem analysis of cathode | Post mortem of cathode | Contact break in cell | Loss of contact | Very poor performance | Very poor performance | Anode disintegration. |

| | Experiment No. | | | | | | | | | |
|---|---|---|---|---|---|---|---|---|---|---|
| | 6 | 7 | 8 | 9 | 10 | 11 | 12 | 13 | 14 | 15 |
| Cathode Starting Material | $Mn_3O_4$ | Natural $FeCr_2O_4$ | FeO | $Co_3O_4$ | $Fe_2CoO_4$ | $FeTiO_3$ | $FeTiO_3$ | $Fe_2TiO_5$ | Synthetic $FeCr_2O_4$ | $NiCr_2O_4$ |
| Structure type | Spinel | Spinel | Rock Salt | Spinel | Spinel | Corundum | Corundum | Pseudo-brookite | Spinel | Spinel |
| Open Circuit Voltage (V) | 2,02 | 1,7 | 1,74 | 2,06 | 2,04 | 2,2 | 2,1 | 1,85 | 1,68 | 2,1 |
| Short Circuit current (A) | 1,9 | — | 1,9 | 2,9 | 2,25 | 1,1 | 2,2 | 0,8 | 1,2 | 2,0 |
| Charge Current (mA) | 50 | 40 | 50 | 50 | 50 | 60 | 60 | 40 | 40 | 40 |
| Discharge Current (mA) | 50 | 40 | 50 | 50 | 50 | 60 | 60 | 40 | 40 | 40 |
| Cut off Limits | | | | | | | | | | |

TABLE 11-continued

| | | | | | | | | | | | |
|---|---|---|---|---|---|---|---|---|---|---|---|
| (V) upper | 2,40 | 2,60 | 2,50 | | 2,5 | 2,5 | 2,4 | 2,4 | 2,4 | 2,1 | 2,3 |
| lower | 0,4 | 0,5 | 0,5 | | 0,5 | 0,5 | 0,8 | 0,8 | 0,6 | 0,5 | 0,9 |
| Voltage plateaus | 1,9(short) | 1,6 | 1,7 | ⎫ | 2,00 short | 1,7–1,0 | 1,6–1,8 | 1,6–1,8 | 1,44 | 1,55 | 2,0 |
| (discharge) | 1,0(short) 0,55 | | 1,5 1,0 0,9 | ⎬ short | 1,2 | short 0,9 | | | 0,8 | | 1,6 |
| Maximum Discharge Capacity (A-hr/g) | 0,51 (11) | 0,20 (3) | 0.54 (14) | | 0,65 (4) | 0,40 (18) | 0,34 (6) | 0,30(8) | 045(1) | 0,27(4) | 0,19(8) |
| Capacity on last recorded cycle (A-hr/gm) | 0,35 (25) | 0,14 (33) | 0,50 (18) | | 0,36 (17) | 0,37 (23) | 0,30 (7) | 0,30(8) | 0,39(5) | 0,23(10) | 0,18(11) |
| Maximum % Cathode Utilization | 55(11) | 21(3) | 59(14) based on conversion to $Fe_3O_4$ | | 73(4) | 44(18) | 11(6) | 10(8) | 13(1) | 9(4) | 7(8) |
| Coulombic Efficiency (%) | 67(11) | 98(3) | 64(14) | | 100(4) | 98(18) | 94(6) | 95(8) | 97(5) | 100(10) | 97(8) |
| Total Cycles | 25 | 33 | 18 | | 17 | 23 | 7 | 8 | 4 | 10 | 11 |
| Total days | 61 | 33 | 36 | | 47 | 39 | 17* | 18* | 17* | 18* | 19* |
| Reason for termination | Post mortem analysis | | Post mortem of cathode | | Post mortem of cathode | Post mortem of cathode | — | — | — | — | — |

Cycle numbers at which values were recorded are given in parentheses; Figures for % Cathode Utilization are based on the complete reduction of the transition metal ions in the oxide framework structure to the metal; and an asterisk indicates that the cell is still in operation.

Once again the initial series of charge/discharge cycles of the cells of Table II acted to activate and transform the oxide starting materials of the cathodes into stable three dimensional framework structures, inert in the cell environment, except for the subsequent usual cell reactions involved in charging and discharging in normal use, where they were found to operate reversibly.

The above experiments also show that $Cr_2O_3$, having a corundum-type structure which is believed not to convert to $Cr_3O_4$ having a spinel-type structure, is a comparatively valueless cathode starting material compared e.g. with alpha-$Fe_2O_3$.

Finally, to demonstrate their utility in primary cells (although their main utility will be in secondary cells) certain of the cathode materials of the invention were loaded into primary cells of the general type described above but having a $LiAlCl_4$ molten salt electrolyte and an operating temperature of 200° C. A representative set of results is set out in the following table, Table III.

TABLE III

| | |
|---|---|
| Experiment No. | 16 |
| Cathode Starting Material | $Fe_2O_3$ |
| Structure Type | Corundum |
| Open Circuit Voltage (v) | 1,82 |
| Short Circuit Current (A) | 2,3 |
| Discharge Current (mA) | 30 |
| Cut off limit (v) (lower) | 1,0 |
| Voltage Plateaus (discharge) | 1,7–1,2 |

TABLE III-continued

| | |
|---|---|
| Maximum discharge capacity (A-hr/gm) | 0,2 |
| Maximum % cathode utilization | 20 |
| Total Cycles | 1 |
| Total time | 20 hours |
| Reason for termination | Primary cell unable to charge |

As far as the cathode framework structure is concerned, the applicant believes that it is a continuous three-dimensional framework structure, i.e. a non-lamellar structure, which has been formed by activation from the starting oxide. During discharge it can react with the alkali-metal ions from the anode by insertion of said ions in the cathode. Activation may involve removal of material from the cathode to provide a three-dimensional oxide framework structure. Thus, discharge involves insertion of alkali/alkaline earth metal ions into the activated framework structure. The stable three dimensional framework structure obtained, is discernable, in more or less modified form, in the charged, partially charged and partially discharged states of the cathode. This structure is stable at temperatures of up to 400° C. and above, and is believed to be porous in the fashion of a micromolecular or atomic sieve, so that at the atomic or ionic level it acts in an essentially three dimensional fashion in receiving and releasing alkali/alkaline earth metal ions during discharge and charging respectively. This leads to the significantly improved results and capacities in terms of ampere-hours/gram, when compared with the substantially two dimensional operation of lamellar or intercalated oxide cathodes such as FeOCl.

In a post mortem analysis of a cell where the anode was derived from alpha-$Fe_2O_3$, it was found that when the cell had been partially discharged, lines of both the $Fe_2O_3$ and $Fe_3O_4$ appeared on the X-ray diffraction pattern. This suggested a change from the $Fe_2O_3$ corundum structure to a $Fe_3O_4$ spinel-type structure, i.e. a rearrangement of the anions and cations in the framework structure. As this change only necessitates the transfer of a single electron in the reduction of one trivalent iron cation to a divalent cation, it cannot account for the total transfer of electrons in the cell reaction, as discharge capacities indicate the transfer of up to 5 or 6 electrons. This is to be contrasted with cathodes derived from sulpho-spinels where discharge must be limited to 2 or 3 electrons to preserve long-cycle reversibility and to avoid destruction, and with cathodes employing spinel-type transition metal oxides known as the "bronzes". According to Dickens & Whittingham Quart. Rev. Chem. Soc. 22, 30 (1968) the term "bronze" is applied to a ternary metal oxide of general formula $M'_xM''_yO_z$ where (i) $M''$ is a transition metal
(ii) $M''_yO_z$ is its highest binary oxide
(iii) $M'$ is some other metal
(iv) X is a variable falling in the range from 0 to 1.

Such a compound has the following characteristic properties (a) it possesses high electrical conductivity, either metallic or semiconducting
(b) it is intensely coloured and in crystalline form shows metallic lustre
(c) it is chemically inert
(d) sequences of solid phases occur through variation of X with definite and sometimes wide ranges of homogeneity.

From a thermodynamic point of view, they are most simply regarded as solutions of metal $M'$ in a matrix of the host oxide $M''_yO_z$. As x in the formulae of such bronzes must be less than 1, the insertion of only a single ion per formula unit is possible while their spinel-type structure remains intact rendering them vastly inferior to the better cathodes of the present invention. A further rearrangement of the spinel-type structure of the cathode of the present invention to a modified spinel-type structure or to some other structure thus cannot be ruled out. Insertion of lithium cations into the spinel-type structure is therefore not the only possibility for the discharge mechanism.

It is believed that the molecular sieve-like nature of the activated cathode structure of the present invention may have maximum pore sizes of less than 70-100 Angstrom units and they may be even less than 30-50 Angstrom units, typically being in the range 2-20 Angstrom units, similar to zeolites except that the pores need not be of uniform size. These pores arise possibly from species produced from the starting materials during the activation, which are dissolved out of the cathode structure by the electrolyte, or at least become detached from the cathode structure during activation. By virtue of the microporous nature of the cathode structure, the three dimensional operation thereof in the cell is promoted, and the potentially extremely high surface area presented thereby is available for reaction (by insertion or penetration into the cathode during discharging and removal during charging) with alkali metal ions such as lithium ions from the electrolyte and/or anode, which may account for the extremely high utilization capacity figures encountered in the experiments. Charging and discharging involving respectively removal or insertion of alkali metal ions from or into the cathode structure may furthermore possibly be supplemented by halogenation of the cathode structure during charging, the halogen ions becoming dissociated from the structure during discharging.

We claim:

1. A method of making a cathode suitable for a secondary electrochemical cell which comprises activating or preconditioning one or more oxides which have a spinel-type or oxospinel-type structure according to the formula $AB_2O_4$ wherein:
at least one of A or B is a transition metal; and
each of A and B is a di-, tri- or tetravalent cation of a metal selected from the group consisting in Ti, V, Cr, Mn, Fe, Co, Ni, Cu, Zn, Mg and Al to form therefrom a cathode which is in the form of a stable three dimensional framework structure, the structure, when in a secondary electrochemical cell with a compatible electrolyte and a compatible anode, being capable of reversible charge/discharge reactions while being stable with regard to other physical or chemical changes in structure the activation or preconditioning being electrical, and comprising subjecting the starting material to a plurality of charge/discharge cycles in an electrochemical cell wherein the starting material forms the cathode, and is coupled via a compatible electrolyte with a compatible anode, the electrolyte having an intrinsic electrolysis voltage threshold greater than the threshold voltage for activation of the cathode.

2. A method as claimed in claim 1, in which the spinel-type structure according to said formula $AB_2O_4$ is the starting material for the cathode, and is preconditioned or activated directly.

3. A method as claimed in claim 1, in which the spinel-type structure according to the formula $AB_2O_4$ is an intermediate in the preconditioning or activation, the starting material which is preconditioned or activated via said spinel-type structure to form the cathode being selected from the group consisting in:
corundum-type structures having the formula $ABO_3$;
bixbyite-type structures having the formula $ABO_3$;
rock salt-type structures having the formula $A(B)O$;
pseudobrookite-type structures having the formula $A_2BO_5$; and
ilmenite-type structures having the formula $ABO_3$, wherein A and B are as defined in claim 1.

4. A method as claimed in claim 3, in which the starting material has a corundum-type structure having the formula $ABO_3$ wherein A and B are as defined in claim 1.

5. A method as claimed in claim 1, in which A is Fe, Co or Mn.

6. A method as claimed in claim 1, in which B is Fe, Ti, Co or Mn.

7. A method as claimed in claim 1, in which the discharge cycles during activation are not taken to completion and discharging is limited to avoid any unacceptable breakdown of the framework structure.

8. A method as claimed in claim 7, in which discharging in the discharge cycles during activation is limited to 80% of theoretical capacity.

9. A method as claimed in claim 1, in which the electrolyte comprises one or more alkali metal halides alone or admixed with one or more aluminium halides.

10. A method as claimed in claim 9, in which the anode comprises one or more alkali metals or alkaline earth metals, alone or in admixture or alloys together and/or with other metals.

11. A cathode for a secondary electrochemical cell whenever made by the method as claimed in claim 1.

12. A cathode as claimed in claim 11, which includes, incorporated therein, an electron-conductive material effective at the intended operating temperature of the cathode to act as a current collector.

13. A cathode as claimed in claim 12, in which the electron conductive material is TiC or graphite.

14. An electrochemical cell which comprises a cathode as claimed in claim 11 coupled via a compatible electrolyte with a compatible anode.

15. A cell as claimed in claim 14, in which the electrolyte comprises one or more alkali metal halides and/or one or more alkaline earth metal halides.

16. A cell as claimed in claim 14, in which the anode comprises one or more alkali metals or alkaline earth metals, alone or in admixture or alloys together and/or with other metals.

17. An electrochemical cell which comprises a cathode coupled via a compatible electrolyte with a compatible anode, the cathode being capable of preconditioning or activation by undergoing a plurality of charge/discharge reactions in the cell to form a cathode as claimed in claim 11.

18. A cell as claimed in claim 17, in which the electrolyte comprises one or more alkali metal halides and/or one or more alkaline earth metal halides.

19. A cell as claimed in claim 17, in which the anode comprises one or more alkali metals or alkaline earth metals, alone or in admixture or alloys together and/or with other metals.

* * * * *